(12) United States Patent
Rehm et al.

(10) Patent No.: US 7,867,694 B2
(45) Date of Patent: Jan. 11, 2011

(54) COMPOSITE POLYMER MICROFLUIDIC CONTROL DEVICE

(75) Inventors: Jason E. Rehm, Alameda, CA (US); Phillip H. Paul, Livermore, CA (US); Douglas R. Cyr, Livermore, CA (US)

(73) Assignee: AB Sciex LLC, Framingham, MA (US)

( * ) Notice: Subject to any disclaimer, the term of this patent is extended or adjusted under 35 U.S.C. 154(b) by 404 days.

(21) Appl. No.: 11/874,815

(22) Filed: Oct. 18, 2007

(65) Prior Publication Data

US 2008/0038674 A1    Feb. 14, 2008

Related U.S. Application Data

(62) Division of application No. 10/666,466, filed on Sep. 16, 2003, now Pat. No. 7,296,592.

(51) Int. Cl.
*B81B 5/00* (2006.01)
(52) U.S. Cl. ...................................... 430/320
(58) Field of Classification Search ........................ None
See application file for complete search history.

(56) References Cited

U.S. PATENT DOCUMENTS

| | | | |
|---|---|---|---|
| 3,661,166 A | 5/1972 | Dickason |
| 5,334,310 A | 8/1994 | Frechet et al. |
| 5,391,587 A | 2/1995 | Wu |
| 5,400,824 A | 3/1995 | Gschwendtner et al. |
| 5,417,235 A | 5/1995 | Wise et al. |
| 5,649,423 A | 7/1997 | Sniegowski |
| 5,885,470 A | 3/1999 | Parce et al. |
| 5,927,325 A | 7/1999 | Bensaoula et al. |
| 6,076,555 A | 6/2000 | Hettinger |
| 6,136,171 A | 10/2000 | Frazier et al. |
| 6,136,212 A | 10/2000 | Mastrangelo et al. |
| 6,238,538 B1 | 5/2001 | Parce et al. |
| 6,279,606 B1 | 8/2001 | Hunnicutt et al. |
| 6,283,440 B1 | 9/2001 | Evans |
| 6,284,072 B1 | 9/2001 | Ryan et al. |
| 6,290,685 B1 | 9/2001 | Insley et al. |
| 6,293,308 B1 | 9/2001 | Hettinger |
| 6,302,134 B1 | 10/2001 | Kellogg et al. |
| 6,408,878 B2 | 6/2002 | Unger et al. |
| 6,422,528 B1 | 7/2002 | Domeier et al. |
| 6,488,872 B1 | 12/2002 | Beebe et al. |
| 6,523,560 B1 | 2/2003 | Williams et al. |
| 6,533,366 B1 | 3/2003 | Barron et al. |
| 6,540,203 B1 | 4/2003 | Hunnicutt |
| 6,782,746 B1 | 8/2004 | Hasselbrink, Jr. et al. |
| 7,296,592 B2 | 11/2007 | Rehm et al. |

(Continued)

OTHER PUBLICATIONS

Office Action for U.S. Appl. No. 10/666,466, mailed Aug. 18, 2005, 6 pages.

(Continued)

*Primary Examiner*—John A. McPherson
(74) *Attorney, Agent, or Firm*—Kristin C. Hilbner; Sheldon Mak & Anderson PC (57) ABSTRACT

A device for microfluidic control comprising a regulator that is moveable in a conduit where the regulator is a composite polymer formed from a composite mixture comprising a polymerizable precursor and a particulate filler.

18 Claims, 7 Drawing Sheets

U.S. PATENT DOCUMENTS

| | | |
|---|---|---|
| 2001/0008212 A1 | 7/2001 | Shepodd et al. |
| 2001/0055812 A1 | 12/2001 | Mian et al. |
| 2002/0017487 A1 | 2/2002 | Huang |
| 2002/0022261 A1 | 2/2002 | Anderson et al. |
| 2002/0025529 A1 | 2/2002 | Quake et al. |
| 2002/0054252 A1 | 5/2002 | Ishii et al. |
| 2002/0058332 A1 | 5/2002 | Quake et al. |
| 2002/0067992 A1 | 6/2002 | Bridger et al. |
| 2002/0170668 A1 | 11/2002 | Beebe et al. |
| 2002/0194909 A1 | 12/2002 | Hasselbrink, Jr. et al. |
| 2002/0198282 A1 | 12/2002 | Jia |
| 2003/0015682 A1 | 1/2003 | Killeen et al. |
| 2003/0055193 A1 | 3/2003 | Lichtenhan et al. |
| 2003/0057391 A1 | 3/2003 | Krulevitch et al. |
| 2003/0062734 A1 | 4/2003 | Faris |
| 2003/0136451 A1* | 7/2003 | Beebe et al. ............... 137/828 |
| 2004/0052929 A1 | 3/2004 | Kirby et al. |
| 2004/0079424 A1 | 4/2004 | Takeda et al. |
| 2004/0123658 A1 | 7/2004 | Kirby et al. |

OTHER PUBLICATIONS

Office Action for U.S. Appl. No. 10/666,466, mailed Feb. 2, 2006, 7 pages.

Office Action for U.S. Appl. No. 10/666,466, mailed Sep. 13, 2006, 7 pages.

Advisory Office Action for U.S. Appl. No. 10/666,466, mailed Dec. 6, 2006, 3 pages.

Notice of Allowance for U.S. Appl. No. 10/666,466, mailed Aug. 10, 2007, 6 pages.

Supplementary European Search Report for European Patent Application 04784156.4, dated Jul. 15, 2008, 2 pages.

Beebe, David J. et al., "Functional hydrogel structures for autonomous flow control inside microfluidic channels," Nature, Apr. 2000, pp. 588-590, vol. 404.

International Search Report for PCT/US04/30202 dated Aug. 29, 2005, 6 pages.

Lungu, Adrian et al., "Solid state studies on the effect of fillers on the mechanical behaviour of photocured composites," Polymer, 1998, pp. 4757-4763, vol. 39, No. 20.

Priola, Aldo et al.,"UV-curable systems containing perfluoropolyether structures: synthesis and characterisation," Macromolecular Chemistry and Physics, 1997, pp. 1893-1907, vol. 198, No. 6.

Provin, Christophe et al., "Complex Ceramic-Polymer Composite Microparts Made by Microstereolithography," IEEE, Jan. 2002, pp. 59-63, vol. 25, No. 1.

Rehm, Jason E. et al., "Mobile Flow Control Elements for High-Pressure Micro-Analytical Systems Fabricated Using In-Situ Polymerization," uTAS, Oct. 2001, pp. 227-229.

Rolland, Jason P. et al., "Solvent-Resistant Photocurable 'Liquid Teflon' for Microfluidic Device Fabrication," J.Am. Chem.Soc., 2004, pp. 2322-2323, vol. 126.

Shoji, Shuchi et al., "Microflow devices and systems," J. Micromech. Microeng., 1994, pp. 157-171, vol. 4.

Tonelli, Claudio et al., "New Fluorinated Thermoplastic Elastomers," J. Applied Polymer Science, 1996, pp. 311-327, vol. 59.

Unger, Marc A. et al., "Monolithic Microfabricated Valves and Pumps by Multilayer Soft Lithography," Science, Apr. 2000, pp. 113-116, vol. 288.

International Search Report for PCT/US04/30202 dated Aug. 29, 2005.

* cited by examiner

COMPOSITE POLYMER MICROFLUIDIC CONTROL DEVICE

CROSS-REFERENCE TO RELATED APPLICATIONS

The present application is a division of U.S. patent application Ser. No. 10/666,466, filed on Sep. 16, 2003 and titled Composite Polymer Microfluidic Control Device, and claims the benefit of the filing date of this application.

U.S. patent application Ser. No. 10/572,181, filed Sep. 15, 2004 as International Application No. PCT/US04/30202, is commonly owned with the present application, claims the same priority date, and names at least one inventor in common with the present application.

BACKGROUND

Microfluidic systems, that is, systems or devices having channels or chambers that are fabricated on the micron or submicron scale, are used to perform a multitude of chemical and physical processes on a micro-scale. Individual components of the microfluidic systems can be used alone or together, for example, to control or measure the transport of fluid inside microchannels. Typical applications for microfluidic systems include analytical and medical instrumentation, industrial process control equipment, and liquid and gas phase chromatography. In these systems, methods to reliably aliquot volumes of sample from one conduit into a second conduit are important for performance of the analysis. In some cases, sample volumes as small as 1 nL are required for analysis, which is a volume too small to be reliably dispensed by known macroscale methods, such as conventional valves or pipettes. It would be advantageous to have a microfluidic system that could be used with a wide range of processes and process liquids and could be fabricated on a microchip platform. It would also be advantageous to have a device with a fast response time and precise control over small sample volumes and flows.

Microfluidic control devices, such as microvalves manufactured from silicon or elastomers, including devices fabricated from hydrogels, soft elastomers with control lines embossed in a substrate, and devices fabricated with structures that are free to move within microchannels are currently known. More information on these devices can be found in Shoji and Esashi, *J., Micromech. Microeng.*, 4, 157-171, 1994; Beebe et al., *Nature*, 404, 588-590, April 2000; Unger et al., *Science*, 288, 113-116, April 2000; and Rehm et al., *uTAS* 2001, 227-229, October 2001. Disadvantageously, however, these devices suffer from one or more of the disadvantages of not being easily integrated into microchip platforms, have excess dead volume, high power requirements, slow response times, are difficult and costly to manufacture and assemble, are able to withstand only modest pressure differentials, are restricted to a narrow range of processes and process liquids, are subject to solvent-induced deformation effects, exhibit performance variations from minor variations in material properties, and respond poorly to solvent-induced shrinkage and swelling.

Therefore, there is a need for a microfluidic control device that has a fast response time, precise control over small gas and liquid flows, and precise control over small gas and liquid volumes in the channels and chambers of microfluidic systems. There is also a need for a microfluidic control device that can be integrated into a microchip platform and is compatible with a wide range of chemical solvents that are used in microfluidic systems.

SUMMARY

According to the present invention, a device for microfluidic control is provided. The device comprises a conduit having a first end and a second end, a first path in fluid flow contact with the conduit, a second path in fluid flow contact with the conduit, and a regulator that is moveable in the conduit. The regulator has an outer dimension that is larger than the first end and the second end so the regulator cannot pass out of the conduit and is comprised of a substantially elastic material having a structural component, which can be a composite polymer formed from a composite mixture comprising a polymerizable precursor and a particulate filler. The composite mixture can additionally comprise a photo-initiator, and/or two or more polymerizable precursors. Optionally, the device can have a plurality of paths, such as first, second, and third paths, where each path is in fluid flow contact with the conduit, and/or a plurality of regulators that are movable in a conduit. The regulator can be substantially incompressible, have optical properties, and/or have a substantially stable volume when exposed to a fluid. Further, the regulator can be formed from a composite mixture in the conduit by the in situ polymerization of the composite mixture with an energy source. The composite mixture can additionally comprise a photo-initiator and the energy source can be a radiating light source. The regulator can also be substantially cylindrically shaped and moveable in a back and forth motion or reciprocating motion within the conduit. Alternately, the regulator can be substantially toothed wheel shaped and rotationally moveable within the conduit. The device can additionally comprise a substrate where the conduit, and/or a plurality of conduits are in the substrate. Optionally, the substrate can have an axle and the regulator can be substantially toothed wheel shaped and rotationally moveable around the axle.

A system for microfluidic control comprising a plurality of conduits is also provided, where each conduit has a first end and a second end, a first path in fluid flow contact with one or more conduit, a second path in fluid flow contact with one or more conduit, and a plurality of regulators, each regulator being independently moveable in a separate conduit. Each regulator has an outer diameter that is larger than the first end and the second end so each regulator cannot pass out of the conduit, and is comprised of a substantially elastic material having a structural component.

The device can be fabricated by combining a polymerizable precursor and a particulate filler to form a composite mixture, introducing the composite mixture into a conduit, and exposing the conduit to an energy source to polymerize the composite mixture in situ thereby forming a regulator. The composite mixture can additionally comprise a photo-initiator and the conduit can be exposed to a radiating light source through a mask to form the regulator. Additionally, the device can have two or more regulators within each conduit, and/or unpolymerized composite mixture can be removed from the conduit. Optionally, a substrate having a plurality of conduits can be selected and the composite mixture can be introduced into each conduit, thereby forming a plurality of regulators. The substrate can have three or more conduits and the composite mixture can be introduced into three or more conduits to form three or more regulators on the same substrate. One or more of the conduits can be exposed to a radiating light to form one or more substantially cylindrically shaped regulators and each substantially cylindrically shaped regulator can be moveable in a back and forth motion within the conduit. Alternately, one or more of the conduits can be exposed to a radiating light to form one or more substantially toothed wheel shaped regulators and each substantially toothed wheel shaped regulator can be rotationally moveable within the conduit. The substrate can additionally have an axle and the conduit can be exposed to a radiating light to form a substantially toothed wheel shaped regulator around the axle.

The device can be used for determining a fluid flow rate in a microfluidic device by moving a fluid with a viscosity past a regulator, thereby moving the regulator at the fluid flow rate. A radiating light is directed to a portion of the regulator such that the radiating light is reflected or transmitted to a detector and the reflected or transmitted light is measured as a periodic signal in time. Then, the signal is processed and the frequency of the signal is determined, followed by relating the signal frequency to the fluid flow rate. The radiating light can be reflected or transmitted to a plurality of detectors. Also, a plurality of radiating lights can be directed to the regulator and the radiating lights can be reflected or transmitted to a plurality of detectors. A device for microfluidic control as described above having a substantially toothed wheel shaped regulator can be used to determine fluid flow rate and the radiating light can be directed to a toothed portion of the regulator such that the radiating light is reflected or transmitted to the detector.

DRAWINGS

These and other features, aspects and advantages of the present invention will become better understood from the following description, appended claims, and accompanying drawings where:

DESCRIPTION

According to one embodiment of the present invention, there is provided a device for microfluidic control. The device comprises a regulator that is moveable in a conduit and is formed from a composite mixture comprising a polymerizable precursor and a particulate filler. The use of a particulate filler in the regulator confers a wide range of desirable properties to the regulator, such as, a range of rigidity versus flexibility, additional tensile and compressive strength, optical properties, and dimensional stability. The regulator can operate under high pressure, such as thousands of pounds per square inch (psi), and the addition of the particulate filler to the regulator provides substantial advantages in reduced compressibility. Further, the microfluidic control device of the present invention has a fast response time and precise control over small gas and liquid flows and small gas and liquid volumes in the channels and chambers of the microfluidic system. Further, the microfluidic control device can be integrated into a substrate, such as a microchip platform.

The microfluidic control device of the present invention can include interconnecting conduits that can be filled with fluids. These devices can be used for analytical procedures such as analysis of chemical and biological substances. Examples of such devices include high-performance liquid chromatography (HPLC) and flow-injection analysis (FIA).

As used in this disclosure, the following terms have the specified meanings.

The term "composite polymer" means a material obtained by the polymerization of a mixture of a particulate filler and one or more polymerizable precursors.

The term "conduit" means any of various channels or networks of channels including capillaries and tubing.

The term "elastic material" means a material that recovers its original shape partially or completely after a deforming force has been removed.

The term "fluid" means any of various liquids, gasses, or loose solid materials in bulk.

The term "micro-scale" means a micron or submicron scale, that is, having at least one cross-sectional dimension in the range from about 0.1 µm to about 500 µm.

The term "microfluidic" means a system or device having channels or chambers that are on the micro-scale.

The term "monolithic polymer" means a polymerized polymerizable precursor without a particulate filler.

The term "regulator" means any of various devices by which a fluid flow can be started, stopped, or adjusted by a movable part that opens, shuts, or partially obstructs one or more openings.

The term "structural component" means a particle or a part affecting the structure, composition, physical make-up, or nature of a substance.

The term "substrate" means a chip with lithographically fabricated microchannels or conduits, and includes other conduit and channel networks such as capillaries and tubing.

The term "comprise" and variations of the term, such as "comprising" and "comprises," are not intended to exclude other additives, components, integers or steps.

All dimensions specified in this disclosure are by way of example only and are not intended to be limiting. Further, the proportions shown in these Figures are not necessarily to scale. As will be understood by those with skill in the art with reference to this disclosure, the actual dimensions of any device or part of a device disclosed in this disclosure will be determined by intended use.

All amounts disclosed herein as a percentage is a weight percent of the total weight of the composition.

Figure 1A:
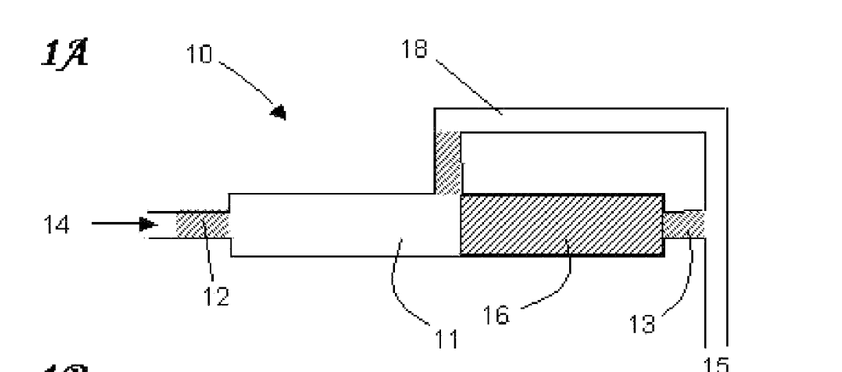
FIGS. 1A, 1B and 1C schematically show a microfluidic control device where the device is a composite check valve according to the present invention.
Figure 1B:
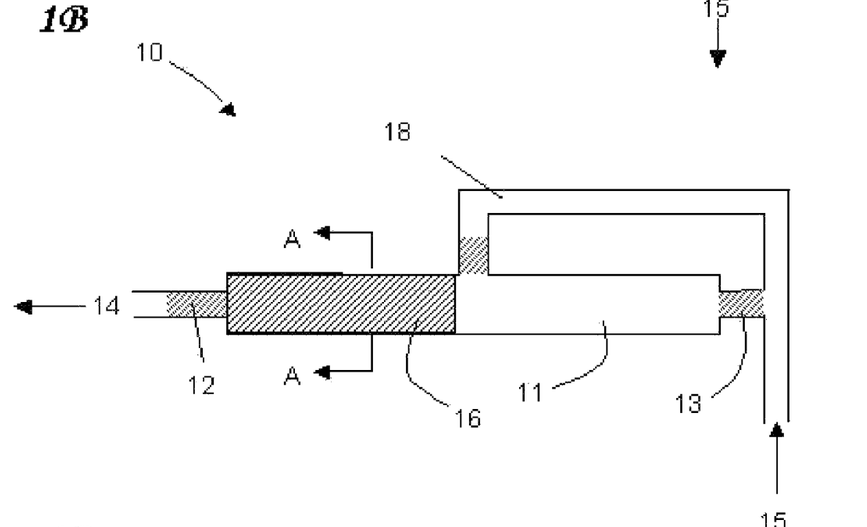
Figure 1C:
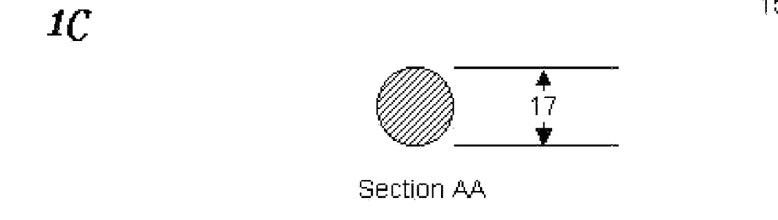

Referring now to FIGS. 1A and 1B, there is schematically shown a microfluidic control device 10 where the device is a composite check valve according to the present invention. The device comprises a conduit 11 having a first end 12 and a second end 13. The conduit has a first path 14 and a second path 15 that are in fluid flow contact with the conduit 11. The device also has a regulator 16 that is moveable in the conduit 11. Referring now to FIGS. 1B, and 1C, the regulator 16 has an outer dimension 17 that is larger than the first end 12 and the second end 13 so the regulator 16 cannot pass out of the conduit 11. FIG. 1C shows the cross-sectional configuration of the regulator 16 at position A-A of FIG. 1B, which illustrates the outer dimension 17 of the regulator 16. The regulator 16 is comprised of a substantially elastic material having a structural component which can be a composite polymer formed from a composite mixture comprising a polymerizable precursor and a particulate filler.

According to one embodiment of the present invention, as shown in FIGS. 1A and 1B, the regulator 16 is a composite check valve comprising a conduit 11 having walls fabricated in such a way that the shape of the conduit 11 encloses the regulator 16. The regulator 16 is movable in the conduit in a reciprocating, that is, a back and forth, or piston-like motion. The motion of the regulator 16 is stopped by an altered conduit geometry. The altered conduit geometry creates a barrier, also referred to herein as a weir, in the conduit 11 so that the regulator 16 cannot pass out of the conduit. In a preferred, but not required embodiment, the geometry of the conduit 11 is altered by changing the depth, width, diameter or shape of the conduit, or inserting another material between the regulator 16 and the conduit 11, such as a porous membrane, that allows fluid flow but prevents the regulator 16 from passing out of the conduit. In a most preferred but not required embodiment, the regulator 16 is a sliding piece that is substantially cylindrically shaped moved by or moving against fluid pressure in a back and forth motion within a cylindrically shaped conduit 11. The movement of the regulator 16 is stopped by narrowing the diameter of the conduit 11. However, other regulator and conduit geometries can be used for stopping the motion of the regulator, as will be understood by those of skill in the art with reference to this disclosure.

The device 10 can additionally comprise an interconnecting conduit 18 that provides a route for fluid to be redirected around the regulator 16 when the regulator 16 is seated against the conduit second end 13, as shown in FIG. 1A. As shown in FIG. 1B, fluid does not pass through the conduit 11 when the regulator 16 is seated against the conduit first end 12.

Referring now to FIGS. 2A, 2B, 2C, and 2D, which schematically show microfluidic control devices according to the present invention, where the device is a composite check valve with an integrated flow path. According to this embodiment, a detached flow path 18, as shown in FIGS. 1A and 1B, is not needed for fluid flow. The device 30 comprises a conduit 31 having a first end 32 and a second end 33. The conduit has a first path 34 that is in fluid flow contact with the conduit 31 and a second path 35 that is in fluid flow contact with the conduit 31. The device also has a regulator 36 that is moveable in the conduit. The regulator has an outer diameter 37 that is larger than the first end 32 and the second end 33 so the regulator 36 cannot pass out of the conduit 31. The regulator 36 is comprised of a substantially elastic material having a structural component. In a preferred but not required embodiment, the regulator 36 is a composite polymer obtained by photoinitiated polymerization of a mixture of particulate filler and one or more polymerizable precursors.

Figure 2:
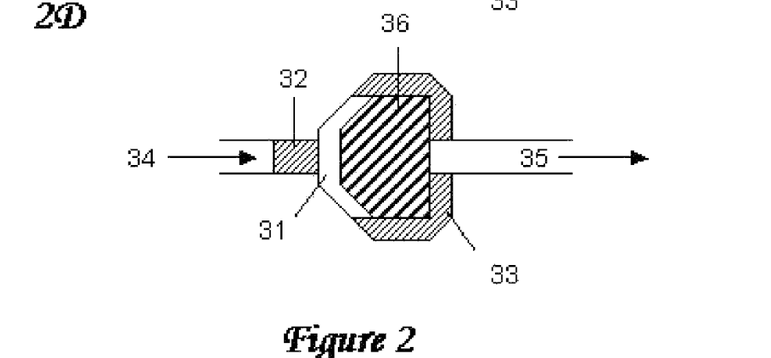
FIGS. 2A, 2B, 2C, and 2D schematically show a microfluidic control device where the device is a composite check valve with an integrated flow path according to the present invention.

Referring again to FIGS. 2A and 2B, FIG. 2A shows fluid flow into the device, which actuates the regulator 36 until the regulator 36 rests against the second end 33. A gap between the second end 33 and the regulator 36 allows unobstructed fluid flow between the first path 34, which is an inlet, and the second path 35, which is an outlet. FIG. 2B shows the device stopping fluid flow in the opposite direction. Fluid entering from the second end 35 actuates the regulator 36 until its rests against the first end 32. The fluid path is blocked and no flow is allowed from the second path 35 to the first path 34. Referring again to FIGS. 2C and 2D, which schematically show an embodiment of the invention where there is no conduit end directly between the second path 35 and the regulator 36. According to this embodiment, the second end 33, which is a side weir, provides the same functionality as the second end 33 shown in FIGS. 2A and 2B.

Figure 3A:
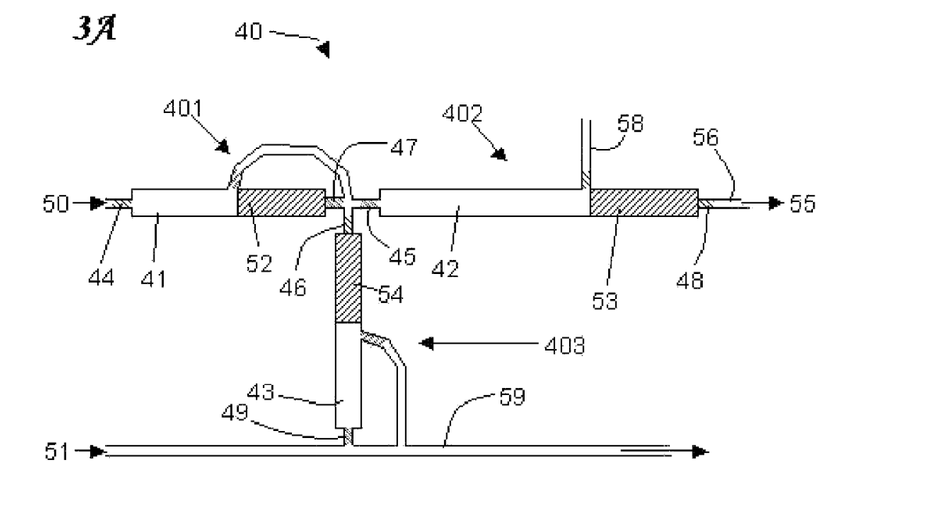
FIGS. 3A and 3B schematically show a system comprising a plurality of microfluidic control devices where the system is a used as a fluid dispenser according to the present invention.
Figure 3B:
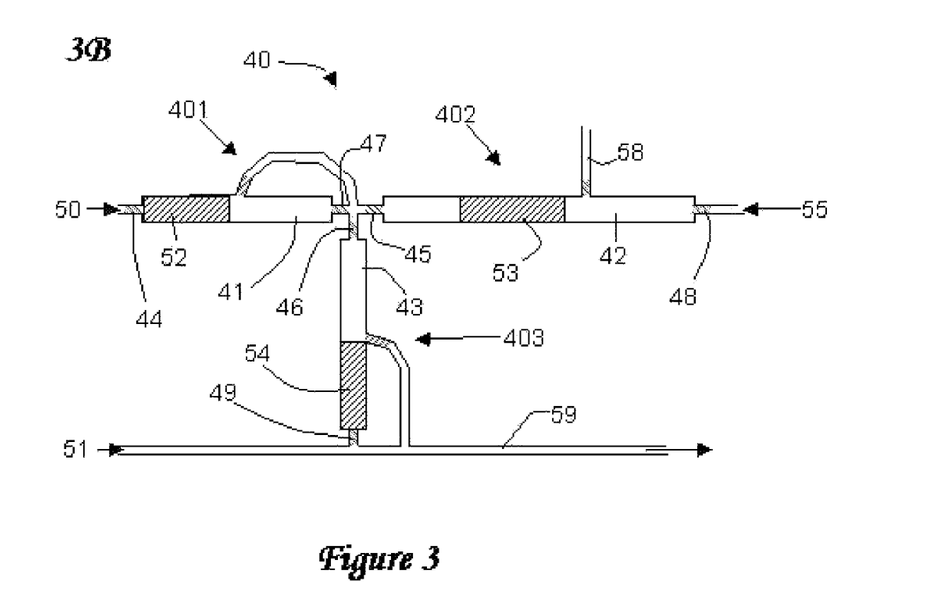

Referring now to FIGS. 3A and 3B, a system comprising a plurality of microfluidic control devices is schematically shown. In this system, multiple regulators are combined to create a system used for dispensing fluid from a sample source, that is, a sample dispenser. FIGS. 3A and 3B show a system comprising a conduit 41, 42, and 43 where each conduit 41, 42, and 43 has a first end 44, 45, and 46, respectively, and a second end 47, 48, and 49, respectively. A first path 50, from a sample source, is in fluid flow contact with the conduit 41, 42, and 43, respectively. A second path 51, from a fluid source, is in fluid flow contact with the conduit 41 and 43, respectively. A flow path 55 is in fluid flow contact with an actuation source. Each regulator 52, 53, and 54 is moveable in the conduit 41, 42, and 43, respectively, and the outer diameter of each regulator 52, 53, and 54 is larger than the first end 44, 45, and 46, respectively, and the second end 47, 48, and 49, respectively, so each regulator cannot pass out of the respective conduit 41, 42, and 43. Further, each regulator 52, 53, and 54 is comprised of a substantially elastic material having a structural component. In a preferred but not required embodiment, the regulator 52, 53, and 54 is a composite polymer obtained by photoinitiated polymerization of a mixture of particulate filler and one or more polymerizable precursors.

FIG. 3A shows the system 40 in a loading position, where sample inlet check valve 401 is in an open position, that is, the regulator 52 is drawn against the second end 47 of the conduit 41; in sample chamber 402 the regulator 53 is a primary piston drawn against the second end 48 of the conduit 42, that is, the conduit closest to an actuation source; and outlet check valve 403 is in the closed position, that is, the regulator 54 is drawn against the first end 46 of the interconnected conduit 43. According to a preferred but not required embodiment, the sample source can be a reservoir of a sample fluid, a system of channels containing a sample fluid, or an external connection to the device containing a sample fluid, such as a syringe. The actuation source is a source of pressure and/or a vacuum used to actuate the primary piston. However, the system can have other configurations for loading and delivering samples and the sample source can be other fluid containing devices, as will be understood by those of skill in the art with reference to this disclosure.

Now referring again to FIGS. 3A and 3B, the system 40 additionally comprises an excess fluid outlet 58 that can be a conduit leading to a waste reservoir, or can be a conduit connected to a vacuum source, or a conduit connected to the actuation source. In another embodiment, the system 40 additionally comprises interconnecting conduits to provide a route to redirect fluid around the regulator 52 and 54. In another preferred but not required embodiment, the device 50 additionally comprises an analysis conduit 59, that is a conduit that can be open and filled with material to connect a fluid, such as a running buffer fluid with another apparatus, such as an analysis column. FIG. 3B shows the system 40 in an analysis position. In the analysis position, the regulator 52 in sample inlet check valve 401 is in a closed position, that is, drawn against the first end 44 of the interconnected conduit 41; the regulator 53 in sample chamber 402 is drawn toward the first end 45 of the conduit 42; and the regulator 54 in sample outlet check valve 403 is in the closed position, that is, drawn against the second end 49 of the interconnected conduit 43. According to the present invention, the system can have other regulator and conduit geometries the device can be used for procedures other than dispensing fluid from a sample source, as will be understood by those of skill in the art with reference to this disclosure.

Figures 4, 4B:
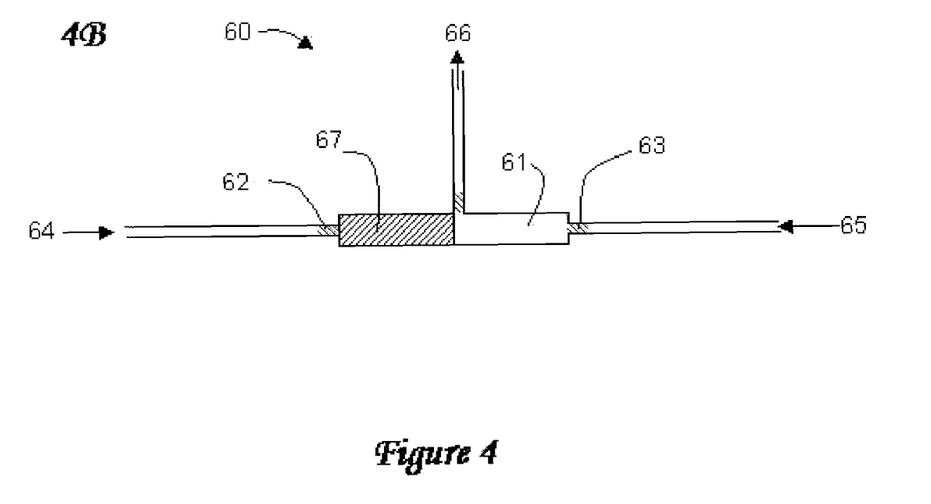
FIGS. 4A and 4B schematically show a microfluidic control device where the device is a mixing valve according to the present invention.
Figure 4A:
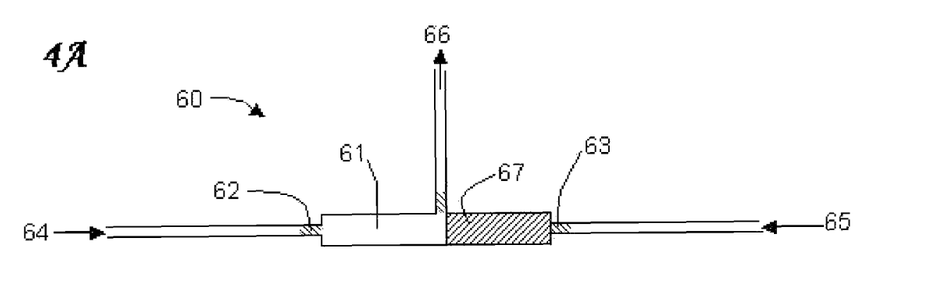

Now referring to FIGS. 4A and 4B, a device for microfluidic control 60 where the device is a mixing valve is shown. The device comprises a conduit 61 having a first end 62 and a second end 63. The conduit 61 has a first path 64, a second path 65, and a third path in fluid flow contact with the conduit 61. The device also comprises a regulator 67 that is moveable in the conduit 61, where the regulator 67 has an outer diameter that is larger than the first end 62 and the second end 63 so the regulator 67 cannot pass out of the conduit 61. Further, the regulator 67 is comprised of a substantially elastic material having a structural component. In a preferred but not required embodiment, the regulator 67 is a composite polymer obtained by photoinitiated polymerization of a mixture of particulate filler and one or more polymerizable precursors which can be a composite polymer formed from a composite mixture comprising a polymerizable precursor and a particulate filler.

Now referring again to FIGS. 4A and 4B, in a preferred but not required embodiment, the device 60 is a mixing valve used for mixing fluids in various concentrations, or to alternate the source of fluid flowing into a conduit. As shown in FIGS. 4A and 4B, the device 60 can be connected to an apparatus, such as an analysis column through flow path 66, and the device 60 can deliver a sample to the apparatus. As shown in FIG. 4A, fluid can flow from flow path 64, which is an inlet flow path to flow path 66, which is an outlet flow path, when the regulator 67 is drawn against the second end 63. The regulator 67 can be drawn against the second end 63 when pressure greater than that in flow path 66 is applied at flow path 64, or pressure at flow path 65 is reduced below that at flow path 64, or a combination thereof. As shown in FIG. 4B, fluid can flow from flow path 65 to flow path 66 when the regulator 67 is drawn against the first end 62. The regulator 67 can be drawn against the first end 62 when pressure greater than that in flow path 66 is applied at flow path 65, or pressure at flow path 64 is reduced below that at flow path 65, or a combination thereof. In another preferred but not required embodiment, the pressure between flow path 64 and 65 can be switched to alternately deliver different fluids from flow path 64 and 65 into the flow path 66, which is an outlet flow path. Inherent fluid dispersion in the outlet flow path 66 can mix the fluids delivered from flow path 64 and 65. The duration of the pressure pulses to flow path 64 and 65 can be varied. For example, the pressure pulse at flow path 64 can be longer than the pressure pulse at flow path 65. Varying the pressure pulse of the flow paths will vary the relative volumes of fluid that are individually delivered from flow path 64 and 65 to flow path 66, and the fluids delivered to flow path 66 can be delivered in defined concentrations. In another preferred but not required embodiment, multiple flow paths can be multiplexed to the outlet flow path 66 such that multiple inlet flow paths, greater than the two inlet flow paths 64 and 65 shown in FIGS. 4A and 4B, can be delivered to the outlet flow path 66, and an alternately connected apparatus. According to the present invention, the device can have other regulator and conduit geometries and the device can be used for procedures other than mixing fluids in various concentrations, or alternating the source of fluid flowing into a conduit, as will be understood by those of skill in the art with reference to this disclosure.

Figure 5A:
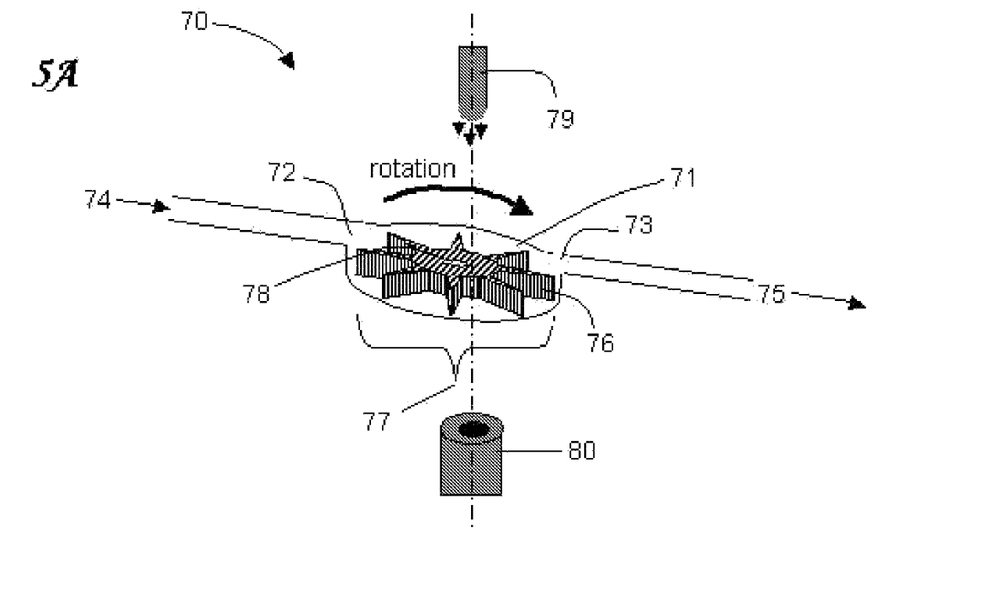
FIGS. 5A and 5B schematically show a microfluidic control device where the device is a flow meter comprising a substantially toothed wheel shaped regulator that is rotationally moveable within a conduit according to the present invention.
Figure 5B:
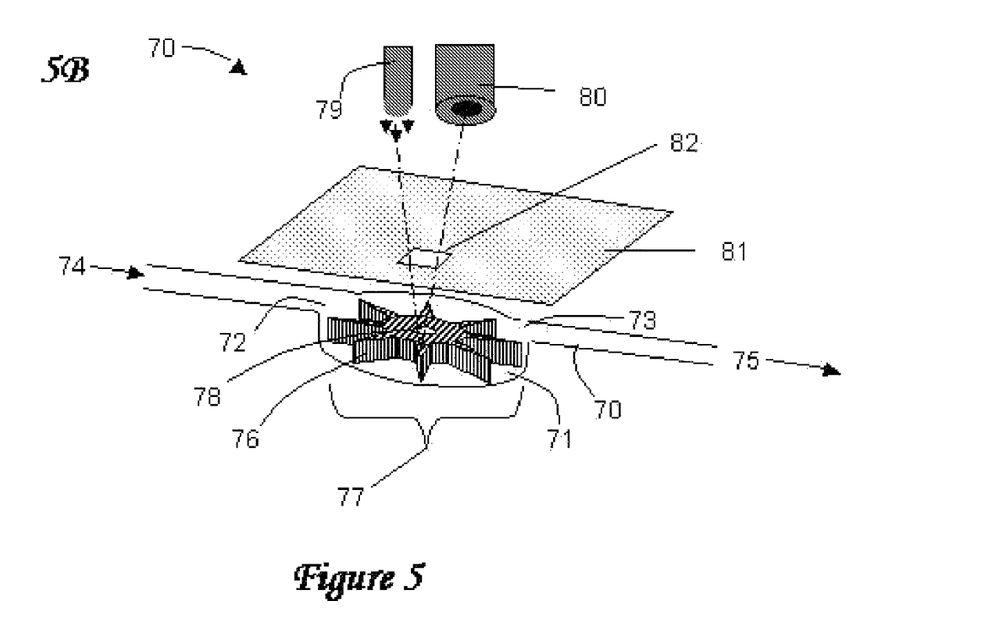

Now referring to FIGS. 5A and 5B, a device 70 for microfluidic control where the device has a substantially toothed shaped regulator, or a gear, that is, a mechanism that performs a function in a machine, is shown. The device comprises a conduit 71 having a first end 72 and a second end 73. The conduit 71 has a first path 74 and a second path 75 in fluid flow contact with the conduit 71. The device also has a regulator 76 that is substantially toothed shaped and moveable in the conduit 71, and the regulator 76 has an outer diameter 77 that is larger than the first end 72 and the second end 73 so the regulator 76 cannot pass out of the conduit 71. Further, the regulator 76 is comprised of a substantially elastic material having a structural component. In a preferred but not required embodiment, the regulator 76 is a composite polymer obtained by photoinitiated polymerization of a mixture of particulate filler and one or more polymerizable precursors. In another preferred but not required embodiment, the substantially toothed shaped regulator 76 is rotationally moveable within the conduit. In a most preferred but not required embodiment, the device 70 additionally comprises a substrate having an axle 78, also referred to herein as an axis or center peg, and the regulator 76 is rotationally movable around the axle. However, the regulator can have other gear configurations that surround a central point or pin, as will be understood by those of skill in the art with reference to this disclosure.

Now referring again to FIGS. 5A and 5B, in a preferred but not required embodiment, the device can be used as a flowmeter. As shown in FIG. 5A, fluid can flow from the first path 74, which is an inlet path, to the second path 75, which is an outlet path, through the conduit 71. When the fluid flows past the regulator 76, viscous drag from the fluid flow in the conduit can turn the regulator 76 at a rate that is a function of the fluid flow. A light source 79 can be used to measure the rotation of the regulator 76, which can be measured by examining the reflected (or transmitted) light incident on a portion of the regulator 76 with a detector 80, such as a photo sensor. As shown in FIG. 5B, a mask 81 with a window 82 can be used to ensure that light is incident only on a region where the teeth of the toothed wheel shaped regulator will be visible. As the regulator 76 turns, and the teeth pass by the window 81, a measured signal of light reflected by the teeth will be periodic in time. In a preferred but not required embodiment, the device does not aliquot fixed volumes of fluid and the regulator can rotate freely in a moving fluid stream. As will be understood by those of skill in the art with reference to this disclosure, the flow meter can operate with other types and arrangement of detectors, such as using a magnetic filler in the regulator and sensing the motion of regulator 76 with a magnetic sensor, for example as used in a Hall field sensor.

A second detector can be added to the device shown in FIGS. 5A and 5B. The second detector can be located adjacent to the detector 80 and along a path that parallels the direction of motion of regulator 76. In this fashion, the two detectors are sequentially illuminated as the regulator 76 rotates. In the illumination sequence, the signal from the first detector 80 changes prior to that from the second detector, or vice versa, providing the direction of rotation and hence the direction of the flow. As will be understood by those of skill in the art with reference to this disclosure, an increased flowrate resolution can be obtained through the addition of a second, a third, and more detectors. Also, a second, a third, and more sources of light can also be added to the device. Additional detectors can be arranged along an arc that is parallel to the arc of rotation of regulator 76, and where the angular spacing of the detectors along this arc does not match the angle between the teeth on regulator 76.

Figure 6:
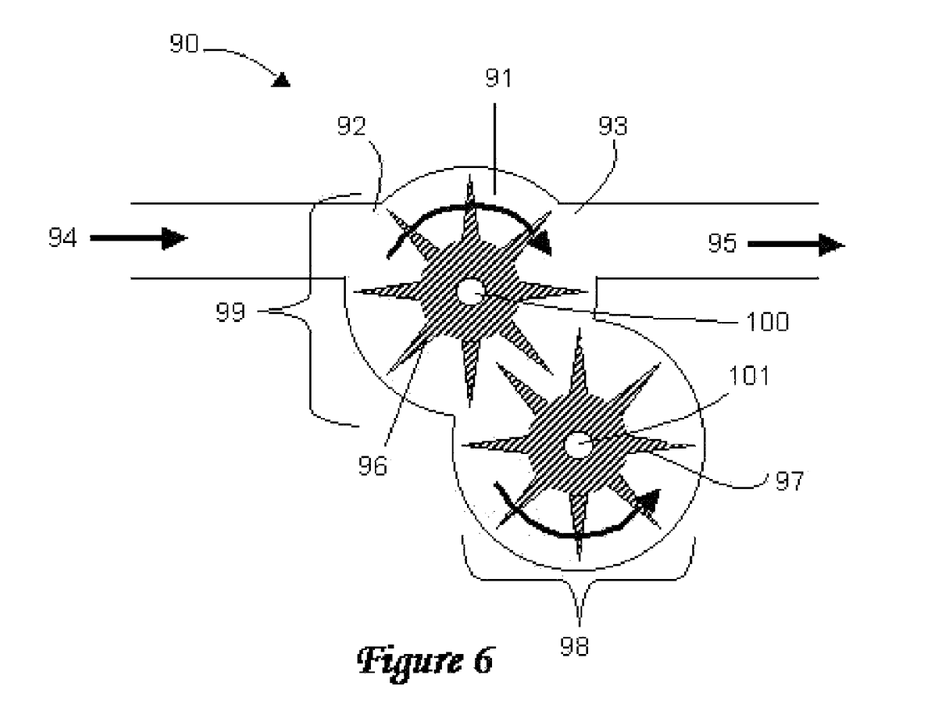
FIG. 6 schematically shows a microfluidic control device where the device comprises a plurality of gears used to perform mechanical work according the present invention.

Now referring to FIG. 6, there is schematically shown a device for microfluidic control 90 where the device has a plurality of substantially toothed shaped regulators, also referred to as gears. In a preferred but not required embodiment, as shown in FIG. 6, the device comprises a conduit 91 having a first end 92 and a second end 93. The conduit 91 has a first flow path 94 in fluid flow contact with the conduit 91, and a second flow path 95 in fluid flow contact with the conduit 91. The device also comprises a plurality of regulators 96 and 97 that are moveable in the conduit 91, and the regulators 96 and 97 each have an outer diameter 98 and 99, respectively, that is larger than the first end 92 and the second end 93 so each regulator 96 and 97 cannot pass out of the conduit 91. Further, each regulator 96 and 97 is comprised of a substantially elastic material having a structural component. In a preferred but not required embodiment, the regulator 96 and 97 is a composite polymer obtained by photoinitiated polymerization of a mixture of particulate filler and one or more polymerizable precursors. In another preferred but not required embodiment, the regulators 96 and 97 are substantially toothed shaped and rotationally moveable within the conduit. In a most preferred but not required embodiment, the device 90 additionally comprises a substrate having an axle 100 and 101 and each regulator 96 and 97 is rotationally movable around the axle 100 and 101. However, the regulator can have other configurations and geometries that surround a central point or pin, including arbitrary geometries, as will be understood by those of skill in the art with reference to this disclosure.

Now referring again to FIG. 6, the device 90 can be used to perform mechanical work. In a preferred but not required embodiment, fluid can flow from the first path 94, which is an inlet path, to the second path 95, which is an outlet path, through the conduit 91, as shown in FIG. 9. When the fluid flows past the upper regulator 97, viscous drag from the fluid flow in the conduit can apply a force to the upper regulator 97, causing it to rotationally move about the axle 100. If more than one gear, such as the lower regulator 96, is meshed with the upper regulator 97, it can actuate or be forced to rotate by the motion of the upper gear 97. However, the device 90 can be used for other procedures, as will be understood by those of skill in the art with reference to this disclosure.

In one embodiment, the regulator is a substantially elastic material having a structural additive or component structure. The regulator can be a composite polymer formed from the polymerization of a composite mixture comprising a polymerizable precursor and a particulate filler. The regulator is movable in the conduit, that is, the regulator will not bond to the surrounding conduit walls or surrounding structures and is free to move or rotate inside the conduit. The regulator is also confined within regions of the conduit, as defined by specific features in the device geometry. In a preferred but not required embodiment, the regulator is formed by the in situ polymerization of the composite mixture in the conduit. In a more preferred but not required embodiment, the in situ polymerization is effected by light exposure or heating. In a most preferred but not required embodiment, the composite mixture is polymerized by the in situ photo-initiated and lithographically defined polymerization of a polymerizable precursor and a particulate filler in the conduit. According to this embodiment, the composite mixture is polymerized in situ in the shape of a mask by exposing a region of the conduit to a radiating light through the mask. The use of a mask allows fabrication of regulators with irregular and arbitrary geometry inside the channel. Furthermore, since the regulators do not bond to the surrounding conduit walls or surrounding structures, the regulators are moveable in the conduit. For example, the regulator can move in a back and forth motion within the conduit, or the regulator can be rotationally moveable in the conduit. When the regulator is formed by photo-initiated polymerization of the composite mixture in situ, optical access to the composite mixture in the conduit region of polymerization is provided. When the regulator is formed by in situ polymerization by thermal or other radiative means, optical access is not necessarily provided.

The composite mixture is comprised of one or more polymerizable precursor and a particulate filler and can additionally comprise a polymerization initiator, such as a photo-initiator, and one or more solvents. The composite mixture can be in the form of a slurry, that is, a liquid containing a particulate filler that may not necessarily be suspended, such as with a particulate filler having a particle size of between about 100 nm and about 100 µm; a colloidal suspension, such as with a particulate filler having a particle size range of between about 1 nm and 100 nm); and a free-flowing liquid. However, the composite mixture can have other forms as will be understood by those of skill in the art with reference to this disclosure.

The polymerizable precursor can be any of various monomer materials, such as butanediol diacrylate, diethylene glycol diacrylate, divinyl benzene, ethylene glycol diacrylate, hexanediol diacrylate, neopentyl glycol diacrylate, pentaerythritol triacrylate, pentaerythritol tetracrylate, propylene glycol diacrylate, trimethylolpropane triacrylate, heptafluorobutyl acrylate, trifluoroethylacrylate, and combinations of the preceding monomers. In a preferred but not required embodiment, the polymerizable precursor is hexanediol diacrylate. However, other polymerizable precursors that are capable of forming a composite polymer can be used according to the present invention, as will be understood by those of skill in the art with reference to this disclosure.

The particulate filler can be in the form of a particle, bead, powder, fumed ceramic, fiber, floc, and other structural material, and a combination of the preceding particulate fillers. The particulate filler can be encapsulated, that is, chemically non-bonded with the surrounding polymer. Alternately, the particulate filler can bond directly to the surrounding polymer. The size of the particulate filler is selected to be less than the smallest dimension of the conduit and can be as small as several nanometers. The composition of the particulate filler can be a glass, ceramic, metals and metal oxides, polymer, carbon black, and combinations of the preceding fillers. The surfaces of the particulate can be modified to control hydrophobicity, reactivity, etc., for example an acrylate-modified silica. In a preferred but not required embodiment, the particulate filler is selected from the group consisting of a silica, such as $SiO_2$, titania, such as $TiO_2$, alumina, such as $AlO_x$, zirconia, such as $ZrO_x$, magnetically permeable materials, such as colloidal iron and iron-nickel alloys, mica, glass, and polymers, such as polytetrafluoroethylene, poly(methyl methacrylate), latex, polystyrene, and combinations of the preceding fillers. In a more preferred embodiment, the particulate filler is silica. However, other forms, sizes, and compositions of the particulate fillers can be used according to the present invention, as will be understood by those of skill in the art with reference to this disclosure.

According to another embodiment of the present invention, a particulate filler can be selected such that the composite polymer regulator is substantially incompressible as compared to a monolithic polymer regulator. The particulate filler can occupy a substantial fraction of the volume of the regulator and the particulate filler can be selected such that the particulate filler is selected to have a higher modulus of elasticity than that of a monolithic polymer. According to the present invention, when the composite polymer regulator is under compression, the compaction of the regulator is limited to a value greater than the filler volume fraction, thereby resulting in increased durability of the regulator under high compressive forces. In a preferred but not required embodiment, a composite polymer regulator will not exceed the bulk polymer elastic limit of the polymer and the composite polymer regulator will be substantially resistant to creep when a compressive force is applied to the composite polymer regulator. However, polymers with other compressive properties can be used according to the present invention, as will be understood by those of skill in the art with reference to this disclosure.

According to another embodiment, the particulate filler or other additives, such as dyes, etc., can be selected to add specific optical properties to a composite polymer regulator. Micro-scale polymer devices can disappear when immersed in a liquid. The use of a particulate filler in the composite mixture results in a composite polymer regulator that can exhibit amplified light scattering and/or light-absorbing and/or fluorescent properties as compared to a monolithic polymer. When a regulator with an optical property is desired, a particulate filler can be selected that is naturally colored and/or that has a refractive index substantially different than that of the bulk polymer and/or that is fluorescent. For example, light reflected, absorbed, or fluoresced from a regulator can be used as a diagnostic to obtain information on the location or orientation or motion of the regulator. Regulators having optical properties can be used in a sensing system, such as with a microfluidic control device that is used as a flow meter. According to the present invention, the particulate filler can be varied to modify other properties of the composite polymer, such as the volume and type of particulate filler can be varied to modify the friction coefficient of the regulator, and the volume and type of filler can be varied to improve the polymerization resolution of the regulator, as will be understood by those of skill in the art with reference to this disclosure.

According to another embodiment of the present invention, a particulate filler can be selected such that the composite polymer has a substantially stable volume when exposed to various fluid compositions, that is, the composite polymer will have reduced or no dimensional change in response to variations in fluid composition, as compared to a monolithic polymer. Micro-scale polymer devices that are immersed in liquid can be prone to solvent-induced dimensional change due to the chemical interaction of the polymer surface with ions in the fluid, that is, the shape and size of the polymer can change with exposure to fluids of varying polarity. This behavior can limit the practical usefulness of polymer devices to perform reliable mechanical functions. According to the present invention, an amount and a composition of a particulate filler can be selected and added to the composite mixture, prior to polymerization, such that the composite polymer containing the selected particulate filler will have reduced or no dimensional change in response to variations in fluid composition. However, composite polymers with other volumetric properties, such as other dimensional change properties, can be used according to the present invention, as will be understood by those of skill in the art with reference to this disclosure.

According to another embodiment of the present invention, a solvent can be combined with the polymerizable precursor and the particulate filler. The solvent component can be any of various solvents capable of being suitably combined with the selected polymerizable precursor and particulate filler, such as water and organic solvents. In a preferred but not required embodiment, the solvent is selected from the group consisting of $C_1$-$C_6$ alcohols, $C_4$-$C_8$ ethers, $C_3$-$C_6$ esters, $C_1$-$C_4$ carboxylic acids, methyl sulfoxide, sulfolane, and N-methyl pyrrolidone, and combinations of the preceding solvents. In a more preferred but not required embodiment, the solvent is methanol. However, other solvents can be used according to the present invention, as will be understood by those of skill in the art with reference to this disclosure.

According to another embodiment of the present invention, a polymerizing element can be combined with the polymerizable precursor and the particulate filler. The polymerizing element can include any of various common polymerization initiators and combinations thereof, such as azobisisobutyronitrile, azobisdihydrochloride, benzoyl peroxide, lauroyl peroxide, potassium persulfate, and other common free radical thermal- and photo-initiators. In a preferred but not required embodiment, the polymerizing element is a photo-initiator. In a more preferred embodiment, the polymerizing element is azobisisobutyronitrile. However, other polymerizing elements can be used according to the present invention, as will be understood by those of skill in the art with reference to this disclosure.

According to another embodiment of the present invention is a method of making a device for microfluidic control. The method comprises combining a polymerizable precursor and a particulate filler to form a composite mixture. Then, the composite mixture is introduced into the conduit. Next, the conduit is exposed to an energy source to polymerize the composite mixture in situ, thereby forming a regulator, where the regulator is movable in the conduit, and the conduit is sized so the regulator cannot pass out of the conduit. In a preferred but not required embodiment, the composite mixture additionally comprises a photo-initiator. In a more preferred but not required embodiment, the conduit is exposed to a radiating light source through a mask to form the regulator.

Figure 7:
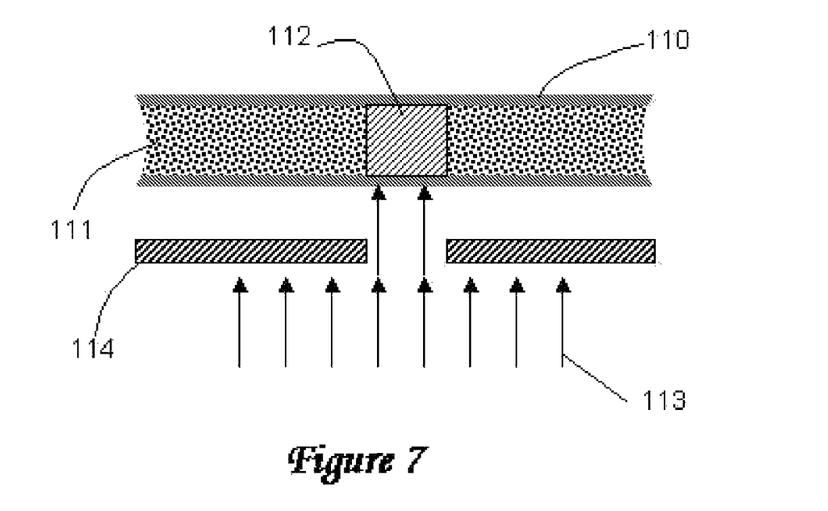
FIG. 7 schematically shows a method of making a device for microfluidic control according to the seventh embodiment of the present invention.
Figure 8:
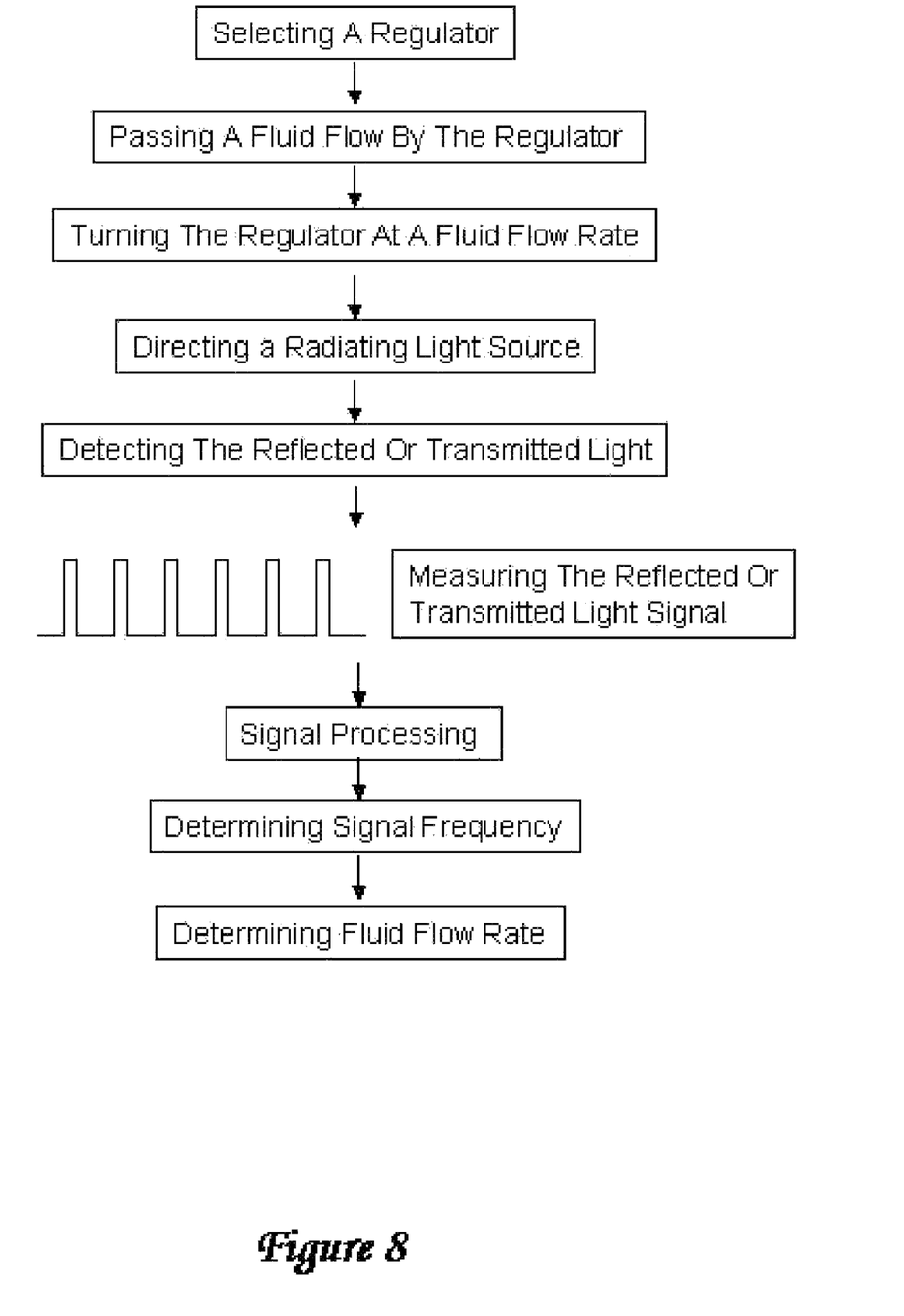
FIG. 8 is a flow chart showing a method of using a device for microfluidic control for determining a fluid flow rate according to the present invention.

Now referring to FIG. 7, which schematically shows a method of making a device for microfluidic control according to the present invention. As shown in FIG. 7, the method comprises selecting a substrate having a conduit 110. Then, a composite mixture 111 comprising a particulate filler, a polymerizable precursor, a solvent and a photo-initiator are combined and introduced into the conduit 110. The composite mixture 111 can be combined by mixing together the liquid and particle components and may be in the form of a slurry, a colloidal suspension, or a free-flowing liquid. Next, a region of the conduit 110 containing the composite mixture 111 is selected. Next, the composite mixture is selectively polymerized and defined in the channel in a specific geometry to form a composite polymer regulator 112 by exposing the conduit 110 to a radiating light 113, which can be ultraviolet light, heat, or other radiation, through an exposure mask 114. Next, the unpolymerized composite mixture 111 is removed from the conduit 110, such as by flushing the conduit 110, thereby forming a composite polymer regulator 112 that is movable in the conduit and sized so the regulator 112 cannot pass out of the conduit 110.

In a preferred but not required embodiment, the method comprises premixing the particulate filler and the polymerizable precursor to form the composite mixture. In a more preferred but not required embodiment, the method additionally comprises forming the composite mixture by combining the particulate filler with a premixed mixture of one or more polymerizable precursors, photo-initiators, and solvents. However, the composite mixture can be combined by other methods, such as combining the composite mixture in situ, as will be understood by those of skill in the art with reference to this disclosure.

In another preferred but not required embodiment, the composite mixture is introduced into a conduit that is an existing microchannel structure or a conduit formed within a substrate. In a more preferred embodiment, the composite mixture is introduced into a conduit by injecting the composite mixture into the conduit.

In a preferred but not required embodiment, the above-described methods for making a device for microfluidic control can be used to fabricate a regulator in a conduit where the conduit can be actuated by pressure. In another preferred embodiment, the above-described methods for making a device for microfluidic control can be used to fabricate fluidic components such as a valve and a flow meter inside a network of microfluidic channels. The method of making a device for microfluidic control can be used to fabricate composite polymer gears inside a conduit. This can be accomplished by fabricating a gear around a center point, which can be a pin or axle formed in the substrate. However, the above described methods for making a device for microfluidic control can be used to fabricate other components for microfluidic control as will be understood by those of skill in the art with reference to this disclosure.

In another embodiment, the present invention is a method for microfluidic control. The method comprises selecting a device for microfluidic control, where the device comprises a conduit having a first path and a second path that are in fluid flow contact with the conduit, and a regulator, where the regulator is movable in the conduit and the conduit is sized so the regulator cannot pass out of the conduit. Then, fluid is placed into the conduit. Next, the regulator is moved by the application of a pressurizing force to direct or stop the fluid flow.

In a preferred but not required embodiment, the fluid is placed in the conduit by injecting the fluid into the conduit. According to the present invention, the initial state of operation of the device is a load state. In the load state, a fluid fills an open conduit between the first path, which is a fluid inlet, and a second path, which is a fluid outlet. The injection can be performed from this initial load state. However, the injection can be performed by other methods, such as with the fluid inlet and fluid outlet at varying pressures, as will be understood by those of skill in the art with reference to this disclosure.

In another preferred but not required embodiment, the method comprises a method for microfluidic control where the device delivers a sample to an apparatus, such as an analysis column. Now referring again to FIGS. 3A and 3B, the method comprises injecting a sample into the device when the device is in a load state. As shown in FIG. 3A, the regulator 53, which is a primary piston, is drawn against the second end 48 of the conduit 42 when the device is in the load state. Then, the sample is injected into the device through the flow path 50 at the first end 44 of the conduit 41. Next, the regulator 53 is actuated by applying a positive pressure, or a pressure that is greater than that of the adjoining conduits through flow path 55, as shown in FIG. 3B. Next, the regulator 53 is moved down the sample chamber 402 and an associated fluid flow and pressure are generated in front of the regulator 53 which moves the regulator 52 and closes is an inlet check valve 401, and also moves regulator 54 and opens outlet check valve 403, as shown in FIG. 3B. Next, the sample flows into an analysis column 59. The injection is completed when the regulator 53 reaches the first end 45 of the conduit 56 at the end of the sample chamber 402. Any fluid from the actuation source that continues to flow into the actuation inlet can be diverted to the excess fluid outlet 58 and an equilibrium pressure can be reached behind the primary piston that will be a function of the hydrodynamic flow resistance of the excess fluid outlet and ability of the actuation source to deliver said pressure at that flow rate. The volume of sample injected into the analysis column can be approximately equal to the original open volume in the sample chamber 402. The method of using the device to deliver a sample can be performed at other pressures, including vacuum, at the fluid outlet 58, the sample inlet, and in the analysis column 59, that are of any value less than the pressure at the actuation source inlet.

In a preferred but not required embodiment, as shown in FIG. 3A, the device is in an inject state when the sample inlet, excess fluid outlet 58, analysis column inlet 49, and outlet are at or near atmospheric pressure, and the regulator 53 is drawn against the second end 48 of the conduit 42. Applying a negative pressure differential (vacuum) to the second end 48 of the conduit 42 through actuation inlet 55 draws the regulator 53, which is a primary piston, toward the actuation inlet 55. The inlet check valve 401 is opened by generating a corresponding fluid flow and vacuum behind the primary piston 53, which opens the inlet check valve 401 and also closes the outlet check valve 403. A sample fluid is drawn from plow path 50 through the first end 44 of the conduit 41, which is a sample inlet, and an open conduit path is created between the sample inlet and an excess fluid outlet 58, as shown in FIG. 3A. Additional suction can be applied to the excess fluid outlet 58 to flush the sample chamber 402 with multiple volumes of sample in order to ensure the sample chamber 402 contains pure sample fluid. This step can also be performed with a separate cleaning/flushing fluid in the sample reservoir in order to clean the device prior to insertion of a new sample fluid. In an alternate embodiment, the excess fluid outlet 58 and flow path to the actuation inlet 56 can be connected to achieve the same effect. The sample inlet, analysis column inlets and outlets can be at various pressures above the actuation inlet/excess fluid outlet pressure in order to achieve this process.

In another embodiment, the pressure in the analysis column 59 can be the highest pressure in the system at that time, leading to the outlet check valve 403 closing immediately after the injection state is terminated. This procedure leads to an alternate method of filling the sample chamber and achieving the load state. Now referring again to FIGS. 3A and 3B, when the actuation inlet and excess fluid outlet are at or near atmospheric pressure and the pressure in the analysis column is above the sample inlet pressure, the regulator 53, which is a primary piston, is in an 'inject' state, where the regulator is drawn against the first end 45 of the conduit 42. Applying a positive pressure differential to the sample inlet forces the inlet check valve 401 to open and the regulator 53 moves toward the actuation inlet 56. The outlet check valve 403 remains closed due to the higher pressure in the analysis column 59. The sample fluid flows through the opened conduit path 41 and fills the sample chamber 402. When the primary piston reaches the second end 48 of the conduit 42, as shown in FIG. 4, the sample fluid flows through the sample chamber and out the excess fluid outlet. The excess fluid outlet can be connected to the second end 48 of the conduit 42 in this embodiment.

Now referring to FIG. 11, which is a flow chart showing the method of using a device according to the present invention as a flowmeter. As shown in FIG. 11, the method comprises selecting a device having a substantially toothed wheel regulator, according to the present invention. Then, a fluid with a viscosity is passed by the regulator, thereby turning the regulator at a fluid flow rate. Next, a radiating light is directed to a toothed portion of the regulator and the radiating light is reflected or transmitted to a detector, such as a photo-sensor. Next, the reflected or transmitted light is measured as a periodic signal in time. Next, the signal is processed and the frequency of the signal is determined and related to the fluid flow rate as a function of the fluid viscosity. In one embodiment, multiple regulators of varying dimensions and conduit cross-sections can be used in succession to widen the dynamic range of the measurement and improve measurement accuracy.

EXAMPLE I

Composite Mixture

A composite mixture was formed from the substances listed in Table I.

TABLE I

| SUBSTANCE | AMOUNT |
|---|---|
| ethoxylated trimethylolpropane triacrylate | 900 μL |
| trifluoroethylacrylate (2,2,2 TFEA) | 100 μL |
| 2,2'-azobisisobutyronitrile | 5 mg |
| Dioxane | 500 μL |
| 500 μL of 2-methoxyethanol | 500 μL |
| silica particles | 10% |

The composite mixture was prepared by mixing the ethoxylated trimethylolpropane triacrylate, SR454, available from Sartomer Corporation, Exton, Pa., US and the trifluoroethylacrylate, 2,2,2 TFEA, available from Sigma-Aldrich Corp., St. Louis, Mo., US to form a monomer mixture. Then, the photo-initiator, 2,2'-azobisisobutyronitrile, AIBN, (5 mg) available from Sigma-Aldrich Corp., St. Louis, Mo., US was added to the monomer mixture. A solvent mixture was prepared by combining the dioxane, available from Sigma-Aldrich Corp., St. Louis, Mo., US and the 2-methoxyethanol, available from Sigma-Aldrich Corp., St. Louis, Mo., US. The monomer mixture and solvent mixture were then mixed in a 8:2 volume:volume ratio, that is, 800 μL of the monomer mixture was mixed with 200 μL of the solvent mixture. A particulate filler of 1 μm diameter, non-porous silica particles (10 wt %), available from Sigma-Aldrich Corp., St. Louis, Mo., US, was then added to the monomer mixture and solvent mixture to create a suspension/slurry of monomer, solvent, and particles.

EXAMPLE II

Incompressibility of Composite Polymers

A particulate filler was selected such that the composite polymer regulator was substantially incompressible, as compared to a monolithic polymer regulator. As a comparative example, a regulator comprising a monolithic polymer was substantially extruded through a fine passage when the regulator was subjected to a 10,000 psi high compressive force. Whereas, a regulator comprising a composite polymer containing a 50% silica particulate filler, prepared according to the present invention, compressed to about 50% of the initial volume. This degree of compression did not exceed the bulk polymer elastic limit of the polymer and the regulator part was substantially resistant to extrusion.

As a further example, the compressive strength of Nylon 6,6 and compared to the compressive strength of a composite polymer prepared with Nylon 6,6 according to the present invention. The compressive strength of Nylon 6,6 was tested and at 10% compression, the compressive strength was about 12,000 psi. Whereas, a composite polymer prepared according to the present invention with 30% glass-filled Nylon 6,6 was tested and the compressive strength at 10% compression was about 39,000 psi.

EXAMPLE III

Volume Stability of Composite Polymers

A particulate filler was selected such that the composite polymer had a substantially stable volume when exposed to various fluid compositions, that is, the composite polymer had reduced or no dimensional change in response to variations in fluid composition, as compared to a monolithic polymer. As a comparative example, a monomer mixture containing ethoxylated trimethylolpropane triacrylate and trifluoroethylacrylate in an 80:20 volume:volume ratio was mixed with methoxyethanol in a 50:50 volume:volume ratio. Trace amounts of azobisisobutyronitrile, a photoinitiator, was added and the mixture was photopolymerized. When the resulting monolithic polymer was placed in water, the element shrank to 55% of its original volume. Whereas, following the same procedure, and adding 7 wt % of particles of colloidal antimony pentoxide, with an outer diameter of 7-11 nm, to the mixture, the polymerized composite polymer shrank by only 20% of its original volume.

EXAMPLE IV

Microfluidic Control Device

A regulator that was used as a composite piston was formed by introducing the composite mixture from Example I into a 150 μm inner diameter optically transparent silica capillary by injecting the composite mixture into the capillary with a syringe. A 2 mm length of the capillary was then exposed to broadband ultraviolet radiation, peaking at around 365 nm with total energy flux of 40 mW/cm$^2$, for 30 seconds. Upon exposure to the ultraviolet radiation, a composite particle-filled solid polymer piston with a length dimension of 2 mm and a width dimension that is approximately equal to the inner diameter of the surrounding capillary was formed. The composite piston did not bond to the surrounding capillary and was thus free floating. The piston was mobilized by applying between about 1 psi to about 5 psi of pressure to one terminal end of this first capillary. An adjoining second capillary, having a 25 μm inner diameter, was connected to the second terminal of the first capillary. The composite piston within the first capillary was pushed against the adjoining capillary and put under pressure in excess of 2000 psi with little to no damage or permanent distortion to the composite piston. Ejecting the composite piston from the first capillary and examining the composite piston under a microscope confirmed the geometry of the composite piston. The composite piston was iteratively exposed to acetonitrile, methanol, isopropanol, water, and aqueous buffers with pH ranging from between about 2 to about 12. The swelling and shrinking of the composite piston was observed between exposures to these liquids and the swelling and shrinking of the composite piston was less than 10% of its original diameter in all cases.

Although the present invention has been discussed in considerable detail with reference to certain preferred embodiments, other embodiments are possible. Therefore, the scope of the appended claims should not be limited to the description of preferred embodiments contained herein.

What is claimed is:

1. A method of making a device for microfluidic control comprising:

a) combining a one or more polymerizable precursors and a particulate filler to form a composite mixture, wherein at least one of the one or more polymerizable precursors is a halogenated acrylate monomer;

b) introducing the composite mixture into a conduit; and c) exposing the conduit to an energy source to polymerize the composite mixture in situ thereby forming a regulator, wherein the regulator is movable in the conduit, and the conduit is sized so the regulator cannot pass out of the conduit.

2. A method according to claim 1 wherein the regulator is substantially incompressible.

3. A method according to claim 1 wherein the regulator has an optical property.

4. A method according to claim 1 wherein the regulator has a substantially stable volume when exposed to a fluid.

5. A method according to claim 1 wherein the inner dimension of the conduit is less than about 1 millimeter.

6. A method according to claim 1 wherein the regulator is substantially cylindrically shaped and moveable in a back and forth motion within the conduit.

7. A method according to claim 1 wherein the regulator is substantially toothed wheel shaped and rotationally moveable within the conduit.

8. A method according to claim 1 wherein the composite mixture additionally comprises a photo-initiator.

9. A method according to claim 1 wherein the composite mixture comprises two or more polymerizable precursors and a particulate filler.

10. A method according to claim 1 wherein the particulate filler is sized to be no more than 50% of the size of the smallest flow path in the conduit.

11. A method of making a device for microfluidic control comprising:

a) combining one or more polymerizable precursors and a particulate filler to form a composite mixture, wherein at least one of the one or more polymerizable precursors is a halogenated acrylate monomer;

b) introducing the composite mixture into a conduit; and c) exposing the conduit to an energy source to polymerize the composite mixture in situ thereby forming a regulator, wherein the regulator is movable in the conduit, and the conduit is sized so the regulator cannot pass out of the conduit, and wherein the composite mixture additionally comprises a photo-initiator and wherein the energy source is a radiating light source and the conduit is exposed to the radiating light source through a mask to form the regulator.

12. A method of making a device for microfluidic control comprising:

a) selecting a substrate having a plurality of conduits;

b) combining one or more polymerizable precursors and a particulate filler to form a composite mixture, wherein at least one of the one or more polymerizable precursors is a halogenated acrylate monomer;

c) introducing the composite mixture into each conduit; and d) exposing each conduit to an energy source to polymerize the composite mixture in situ thereby forming a plurality of regulators, wherein each regulator is movable in a conduit and each conduit is sized so the regulator cannot pass out of the conduit.

13. A method according to claim 12 additionally comprising removing unpolymerized composite mixture from a conduit.

14. A method of making a device according to claim 12 wherein the substrate has three or more conduits, and the composite mixture is introduced into three or more conduits to form three or more regulators on the same substrate.

15. A method of making device according to claim 12 wherein the energy source is a radiating light source and one or more conduits is exposed to the radiating light source to form one or more substantially cylindrically shaped regulators, and each substantially cylindrically shaped regulator is moveable in a back and forth motion within the conduit.

16. A method of making a device according to claim 12 wherein the energy source is a radiating light source and one or more conduits is exposed to the radiating light source to form one or more substantially toothed wheel shaped regulators, and each substantially toothed wheel shaped regulator is rotationally moveable within the conduit.

17. A method of making a device according to claim 12 wherein the device comprises two or more conduits and two or more regulators and the energy source is a radiating light source and each conduit is exposed to the radiating light source to form a regulator within each conduit.

18. A method of making a device according to claim 12 wherein the substrate has an axle, and the conduit is exposed to a radiating light to form a substantially toothed wheel shaped regulator around the axle.

* * * * *